United States Patent [19]

Beneteau et al.

[11] Patent Number: 5,449,878
[45] Date of Patent: Sep. 12, 1995

[54] RESISTANCE SPOT WELDING OF METAL, PARTICULARLY ALUMINUM

[75] Inventors: Donald J. Beneteau, Amherstburg; Michael J. Beneteau, Windsor, both of Canada

[73] Assignee: Doben Limited, Windsor, Canada

[21] Appl. No.: 257,837

[22] Filed: Jun. 9, 1994

[51] Int. Cl.$^6$ ............... B23K 11/10; B23K 11/36
[52] U.S. Cl. ............... 219/117.1; 219/86.1; 219/91.2
[58] Field of Search ............... 219/78.14, 117.1, 118, 219/119, 86.1, 91.2; 15/21.1, 88.4; 29/81.12

[56] References Cited

U.S. PATENT DOCUMENTS 3,015,713  1/1962  Eckler ............... 219/86

FOREIGN PATENT DOCUMENTS 2855041  6/1980  Germany ............... 219/86.1

OTHER PUBLICATIONS

Sparagen & Claussen, "Resistance Welding Aluminum", Supplement to *Journal of the American Welding Soc.*, Jul. 1940, pp. 250–255.

*Primary Examiner*—Bruce A. Reynolds
*Assistant Examiner*—J. Pelham
*Attorney, Agent, or Firm*—Allen D. Gutchess, Jr.

[57] ABSTRACT

A method and apparatus for resistance spot welding aluminum comprises polishing the electrode tips periodically after a number of welds. During the spot welding, a coating or dust builds up on the electrode tips and this has been generally assumed to be pure aluminum. However, it has been found that the coating or dust is aluminum oxide which is nonconductive. Consequently, when power is applied to the electrodes there is a slight spitting or explusion at the electrode tips which are in contact with the aluminum surfaces. The electrodes thus become pitted or arced out after a few welds. To overcome this problem, the electrode tips are polished intermittently after a predetermined number of welds. This can be accomplished by a polishing wheel which is moved between the electrodes when they are in an open position. The polishing wheel preferably is moved against one of the electrode tips for a short period of time and then against the other electrode tip for a similar period, after which the polishing wheel is retracted.

7 Claims, 2 Drawing Sheets

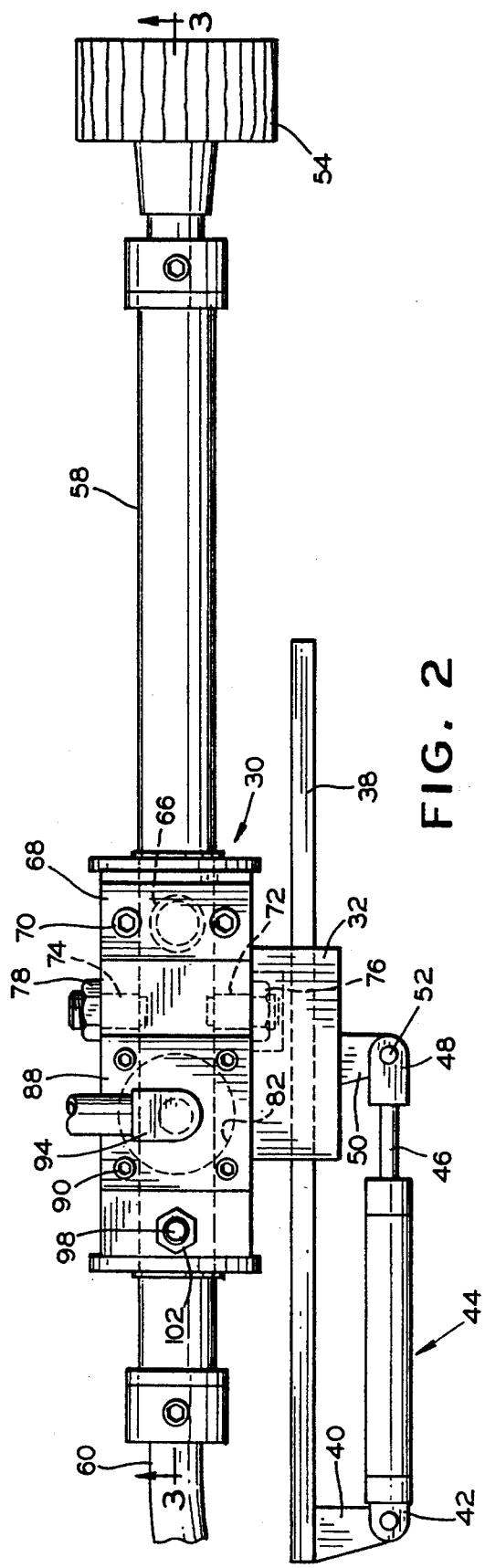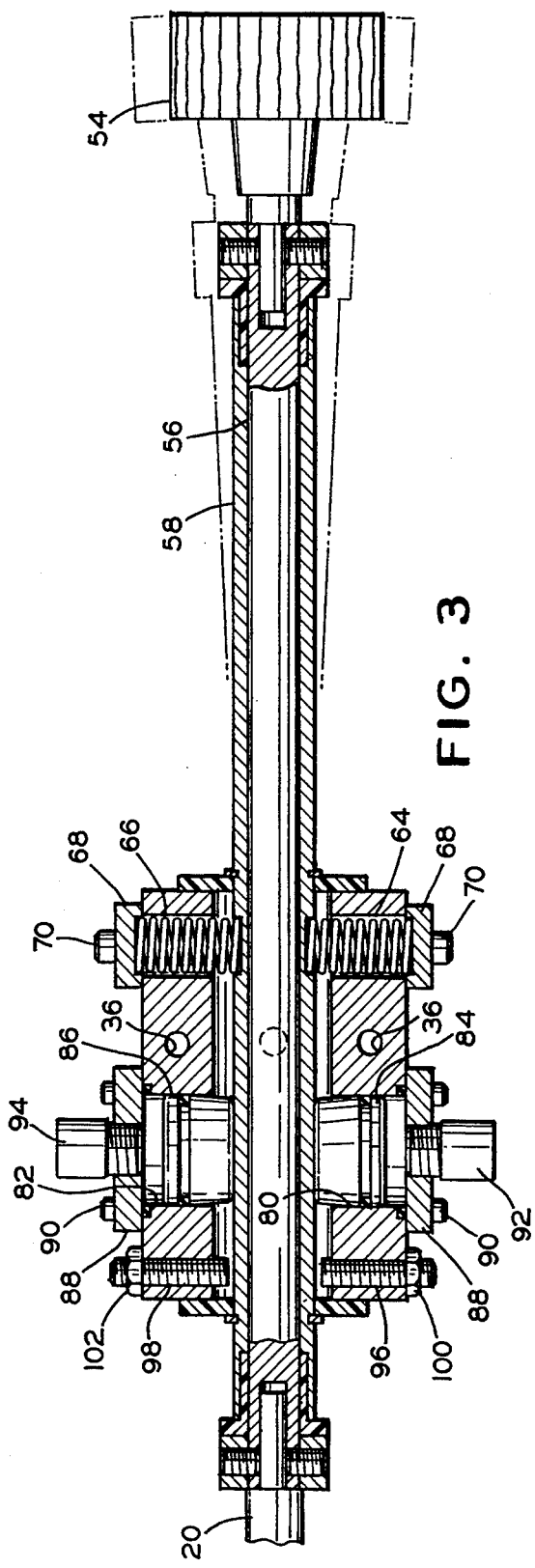

RESISTANCE SPOT WELDING OF METAL, PARTICULARLY ALUMINUM

This invention relates to a method and apparatus for resistance spot welding metals, particularly aluminum.

Resistance spot welding of aluminum has always been OS difficult because of short electrode life, electrode deformation, and high electrical energy requirements. During the spot welding, a coating or dust builds up on the electrodes. It has generally been assumed that this coating or dust was pure aluminum. However, if this were the case, the aluminum would be conductive and not be a problem. Rather, it has been found that the coating or dust is aluminum oxide which is nonconductive. Consequently, when power is applied to the electrodes, there is a slight spitting or explusion at the electrode tips in contact with the aluminum surface. This is caused by aluminum oxide being expelled with the oxide being an electrical insulator. The electrodes thus become pitted or arced out after a few welds.

To overcome this problem, in accordance with the invention, the electrodes are polished intermittently after a predetermined number of welds, e.g. eight. This enables the electrodes to have a much longer life and be used for up to three thousand welds. To accomplish this, a polishing wheel can be moved between the electrodes when they are in an open, non-welding position. The polishing wheel is preferably rotated by a flexible shaft and motor and is rotating when moved into the position. The polishing wheel is then moved against one of the electrode tips for a short period of time and then against the other electrode tip for a similar period, after which the polishing wheel is retracted. The entire operation only consumes a few seconds. Depending upon the particular welding application, the welding equipment with the electrodes can be moved, by being swung in an arc, for example, to a polishing unit that is stationary.

The polishing of the electrodes not only extends their life but produces better resistance spot welds even with aluminum that has contaminants such as oxides or lubricant on its surface.

The welding equipment employed for welding the aluminum preferably is of the type shown in U.S. Pat. No. 4,504,725, issued Mar. 12, 1985, or in U.S. Pat. No. 4,525,618, issued Jun. 25, 1985. In this apparatus, a transformer and electrode holders are mounted as one unit. Shunts employed with the electrode holders are short and heavy and minimize electrical loss. The efficient secondary loop has low impedence so that only about 20% of the energy from the primary power lines is required for good weld quality. This enables the welding equipment to only consume about as much power as when steel is resistance welded with less efficient units.

In the above two patents, the welding equipment is powered by a pressure intensifier cylinder, as shown in U.S. Pat. No. 4,135,076, issued Jan. 16, 1979, for example. With such cylinders, the electrodes can be moved quickly to the surfaces to be resistance welded, providing a soft touch approach. Once the electrodes contact the surfaces, the electrode force is increased to the preselected weld force. Electrode indentation in the materials to be welded determines the electrical contact resistance which in turn determines the welding current. This is a mechanical problem that cannot readily be solved electrically. The results are reduced electrode deformation, increased electrode life and consistent weld quality.

It is, therefore, a principal object of the invention to provide a method and apparatus for resistance spot welding aluminum having the advantages discussed above.

Another object of the invention is to provide a method and apparatus for resistance spot welding metals by polishing, at intervals, tips of electrodes used in the welding process.

Many other objects and advantages of the invention will be apparent from the following detailed description of a preferred embodiment thereof, reference being made to the accompanying drawings, in which:

FIG. 2 is an enlarged top view of the polishing apparatus of FIG. 1; and

FIG. 3 is a view in cross section taken along the line 3—3 of FIG. 2 and showing two positions of a polishing wheel in broken lines.

Figure 1:
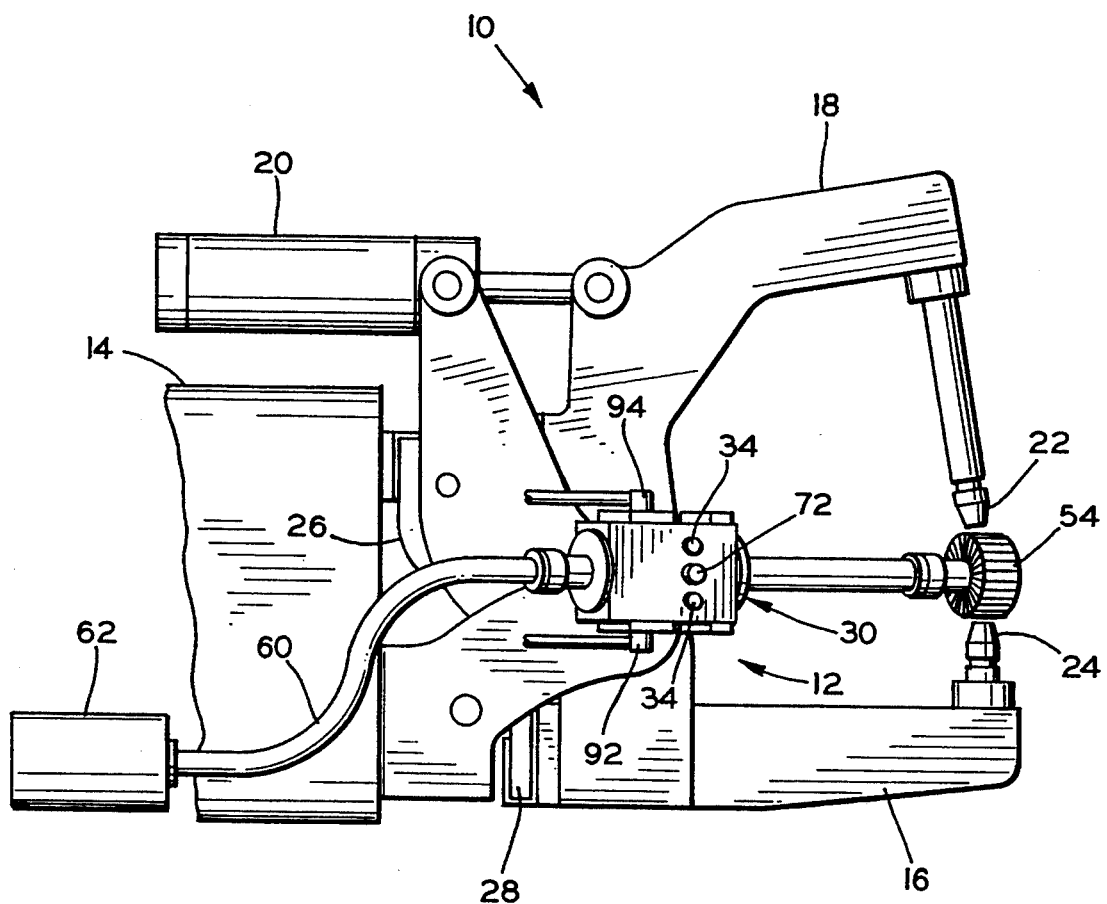
FIG. 1 is a somewhat schematic side view in elevation with parts broken away of welding apparatus and polishing apparatus embodying the invention.

Referring to the drawings, welding apparatus indicated at 10 can be of the type disclosed in the aforesaid U.S. Pat. No. 4,504,725, having a compound electrode holder. The apparatus can also be of the type shown in the aforesaid U.S. Pat. No. 4,525,618. In view of these disclosures, and the fact that the polishing apparatus can be used with various welding units, the apparatus 10 will not be described in detail. In each of these disclosures, the apparatus includes a stationary electrode and S a movable one. The welding apparatus can also have two movable electrodes with either a vertical disposition or a horizontal disposition. The electrode holders can also extend downwardly below the welding apparatus.

Polishing apparatus indicated at 12 can be positioned and modified, if necessary, to accommodate almost any type and position of the electrodes.

The power supply for the welding apparatus 10 can include a transformer 14 which can be of the type shown in my U.S. Pat. No. 4,525,618 and will not be discussed in detail. Other power supplies can be employed, with the transformer 14 allowing the advantage of providing some degree of portability and compactness for the overall welding apparatus. The apparatus includes a lower electrode holder 16 and a compound, upper electrode holder 18. The latter is powered by a pressure-intensifier cylinder 20 which can be of the type shown in the aforesaid U.S. Pat. No. 4,135,076. This type of cylinder can move a movable electrode 22 rapidly toward the material to be resistance spot welded and then move the electrode more slowly and under more power against the material. This soft touch makes the weld more mechanically repeatable and minimizes deformation of the electrodes. This also provides a longer electrode life.

The lower, stationary electrode holder 16 has an upwardly-extending electrode 24 which is in alignment with the electrode 22 when they are in a closed position against the material to be welded. Power is supplied to the movable electrode holder 18 and the electrode 22 through a shunt 26 and power is supplied to the electrode holder 16 through a shunt 28. These are shown and discussed in more detail in the aforesaid U.S. Pat. No. 4,504,725. The shunts enable welds to be accomplished with low impedance so that even though aluminum requires approximately three times the welding current as compared to welding the same gauge steel, the efficiency of the welding apparatus 10 enables only about the same amount of power to be used with aluminum as when steel is welded with inefficient set-ups.

Referring to the polishing apparatus 12, a pivot block 30 is mounted in a supporting block 32 (FIG. 2) by bolts 34 (FIG. 1) which extend through bores 36 (FIG. 3) in the block 30. The supporting block 32 slides on a stationary guide bar 38 which is suitably supported. The guide bar 38 is connected at one end by a tab 40 to ears 42 of a fluid-operated cylinder 44. The cylinder 44 has a piston rod 46 connected by a clevis 48 to a tab 50 by pins 52, the tab 50 being affixed to the supporting block 32. When the piston rod 46 is extended, it moves the supporting block 32 and the pivot block 30 along the guide bar 8. Polishing means in the form of a brush or wheel 54 is then moved between the electrodes 22 and 24, as shown in FIG. 1.

The polishing brush or wheel 54 is commercially-available and is affixed to an end of a shaft 56 (FIG. 3) which extends through a tubular housing 58 where it is suitably connected to a flexible shaft 60. The shaft 60 is rotated by a motor 62 shown in FIG. 1. The polishing wheel 54 can be rotated at a speed in the order of 300 rpm.

When the polishing wheel 54 is moved between the electrodes 22 and 24, it is held in a center position, not touching either electrode, by a pair of opposed springs 64 and 66 which are held in the pivot block 30 and press against flats milled on the tubular housing 58. The springs are held in the block 30 by plates 68 and machine screws 70. The tubular housing 58 is pivotally mounted in the pivot block 30 by pins 72 and 74, the ends of which extend into recesses or holes in the tubular housing 58. The pivot pins 72 and 74 can be adjusted by lock nuts 76 and 78. The pivot pin 72 can be received in a recess in the block 32.

Cylinders 80 and 82 are formed in the block 30 and contain pistons 84 and 86. These are contained by covers 88 and machine screws 90. When fluid is supplied under pressure through a line 92, the piston 84 moves the tube 58, the shaft 60, and polishing wheel 54 to the lower position shown in dotted lines in FIG. 3 and against the lower electrode 24. Similarly, when fluid under pressure is supplied through a line 94 to the piston 86, the tube 58, shaft 60, and polishing wheel 54 move to the upper position shown in dotted lines in FIG. 3 and against the upper electrode 22. Each electrode is polished for only about a second so that the overall polishing operation can be accomplished in a few seconds, including extending and withdrawing the pivot block 30 and the polishing components.

Stop screws 96 and 98 are located at an end portion of the pivot block 30 to limit the pivotal movement of the tube 58 and thereby adjust the extent of pressure of the polishing wheel 54 on the electrodes. The stop screws 96 and 98 are locked in position by nuts 100 and 102.

Various modifications of the above-described embodiment of the invention will be apparent to those skilled in the art, and it is to be understood that such modifications can be made without departing from the scope of the invention, if they are within the spirit and the tenor of the accompanying claims.

We claim:

1. In apparatus for resistance spot welding aluminum pieces by means of two electrodes having tips, means for moving the electrodes to a closed position against the opposite sides of the aluminum pieces, means for moving the electrodes apart to an open position, and means for applying power to weld the aluminum pieces together when the electrodes are in the closed position against the aluminum pieces, the improvement comprising a polishing brush, a shaft connected to said polishing brush, a tubular housing through which said shaft extends, a pivot block through which said shaft extends, a pivot block through which said tubular housing extends, spring means carried by said pivot block for centrally positioning said polishing brush between said electrode tips, fluid-operated piston means in said pivot block engagable with said tubular housing for moving said polishing brush against one electrode tip and then against the other electrode tip, and means in said pivot block for limiting pivotal movement of said polishing brush toward and away from said electrodes.

2. Apparatus according to claim 1 wherein a supporting block is affixed to said pivot block, a stationary guide bar slidably supports said supporting block, and fluid-operated means are connected to said stationary guide bar and said supporting block for moving said supporting block and said pivot block toward and away from said electrodes.

3. In apparatus for resistance spot welding aluminum pieces by means of two electrodes having tips, means for moving the electrodes to a closed position against the opposite sides of the aluminum pieces, means for moving the electrodes apart to an open position, and means for applying power to weld the aluminum pieces together when the electrodes are in the closed position against the aluminum pieces, the improvement comprising polishing means located adjacent said apparatus and on the same side of the aluminum pieces as said apparatus, said polishing means comprising a polishing brush, a shaft connected to said polishing brush, a tubular housing through which said shaft extends, a pivot block through which said tubular housing extends, fluid-operated means in said pivot block engagable with said tubular housing for moving said polishing brush against one electrode tip and then against the other electrode tip, and opposing spring means in said pivot block for centrally positioning said polishing brush between said electrode tips.

4. Apparatus according to claim 3 wherein adjustable means are in said pivot block for limiting pivotal movement of said polishing brush toward and away from said electrodes.

5. Apparatus according to claim 3 wherein a supporting block is affixed to said pivot block, a stationary guide bar slidably supports said supporting block, and fluid-operated means are connected to said stationary guide bar and said supporting block for moving said supporting block and said pivot block toward and away from said electrodes.

6. In apparatus for resistance spot welding aluminum pieces by means of two electrodes having tips, means for moving the electrodes to a closed position against the opposite sides of the aluminum pieces, means for moving the electrodes apart to an open position, and means for applying power to weld the aluminum pieces together when the electrodes are in the closed position against the aluminum pieces, the improvement comprising polishing means, said polishing means being located adjacent a side of said apparatus, said polishing means including a polishing brush, a shaft connected to said polishing brush and extending toward said electrodes, a tubular housing through which said shaft extends, a pivot block through which said tubular housing extends, means in said pivot block to move said tubular housing, said shaft, and said polishing brush in a manner such that said polishing brush moves against one electrode tip and then against the other electrode tip, a supporting block affixed to said pivot block, a stationary slide guide bar slidably supporting said supporting block, and means connected to said stationary slide guide bar and said supporting block for moving said supporting block and said pivot block toward and away from said electrodes.

7. Apparatus according to claim 6 wherein said pivot block has adjustable means therein for limiting pivotal movement of said polishing brush toward and away from said electrodes.

* * * * *

UNITED STATES PATENT AND TRADEMARK OFFICE
CERTIFICATE OF CORRECTION

PATENT NO. : 5,449,878
DATED : September 12, 1995
INVENTOR(S) : Donald J. Beneteau and Michael J. Beneteau It is certified that error appears in the above-identified patent and that said Letters Patent is hereby corrected as shown below:

Column 1, line 8, delete "OS".

Column 2, line 32, delete "S".

Column 3, line 13, change "SO" to --50--.

Column 3, line 16, change "8" to --38--.

Signed and Sealed this

Seventh Day of November, 1995

Attest:

BRUCE LEHMAN

Attesting Officer

Commissioner of Patents and Trademarks